C. WUENSCH.
HOLE PLUG FOR JUNCTION BOXES AND SIMILAR STRUCTURES.
APPLICATION FILED APR. 21, 1916.
1,239,243.
Patented Sept. 4, 1917.
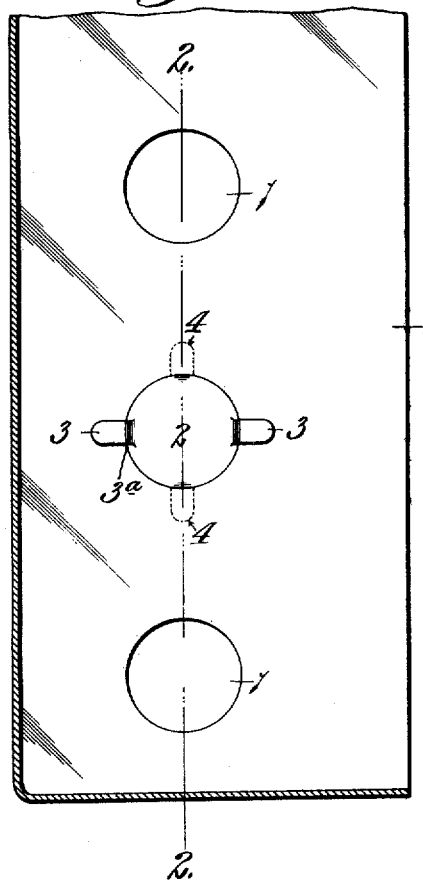
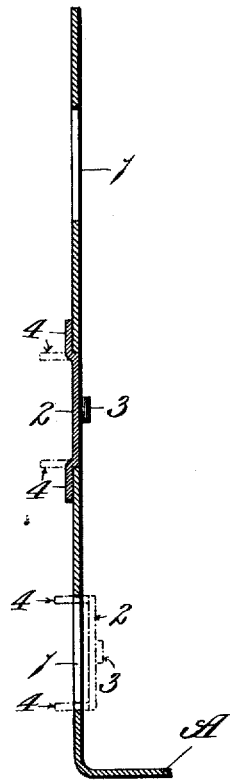
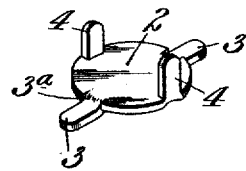
Inventor,
Charles Wuensch.
By Bakewell & Church, Attys.

UNITED STATES PATENT OFFICE.

CHARLES WUENSCH, OF ST. LOUIS, MISSOURI, ASSIGNOR TO FRANK ADAM ELECTRIC COMPANY, OF ST. LOUIS, MISSOURI, A CORPORATION OF MISSOURI.

HOLE-PLUG FOR JUNCTION-BOXES AND SIMILAR STRUCTURES.

1,239,243.               Specification of Letters Patent.        Patented Sept. 4, 1917.

Application filed April 21, 1916. Serial No. 92,671.

*To all whom it may concern:*

Be it known that I, CHARLES WUENSCH, a citizen of the United States, residing at St. Louis, Missouri, have invented a certain new and useful Improvement in Hole-Plugs for Junction-Boxes and Similar Structures, of which the following is a full, clear, and exact description, such as will enable others skilled in the art to which it appertains to make and use the same.

This invention relates to junction boxes, distributing center cabinets and similar structures, and particularly to boxes of the type that are provided with a sufficient number of holes to receive the greatest number of electrical conductors that it may be desired to run into the box, and removable closures for covering the holes in the box that are not used to run wires into the box.

The main object of my invention is to provide a hole plug or removable closure for boxes or cabinets of the type referred to that can be manufactured cheaply and installed easily, and which is so designed that when it is arranged in operative position it will be locked securely in the box in such a manner that it cannot possibly work loose.

Another object is to provide a hole plug of the character referred to, which is so constructed that when it is locked in operative position the body portion of same lies flush with the wall of the box in which the plug is arranged.

Figure 1 of the drawings is a front elevational view of a portion of a junction box or similar structure equipped with a hole plug constructed in accordance with my invention.

Fig. 2 is a vertical sectional view of said box, taken on the line 2—2 of Fig. 1; and Fig. 3 is a perspective view of my improved hole plug.

Referring to the drawings, which illustrate the preferred form of my invention, A designates a junction box, distributing center cabinet or similar structure formed of sheet metal or any other suitable material and provided with a plurality of holes 1 through which electrical conductors can be run into the box. After the wiring has been completed the holes 1 in the box that are not used are closed by means of hole plugs of the construction shown in Fig. 3.

Each of said plugs comprises a body portion 2 that conforms to the shape and size of the holes 1 in the box, a means 3 on said body portion that is adapted to bear against one side of the wall of the box in which the plug is arranged, and a means 4 on said body portion that is adapted to be bent into engagement with the other side of said wall. The body portion 2 is preferably flat and of substantially the same thickness throughout its entire area as the thickness of the wall of the box in which the plug is arranged, and the means 3 on said body portion that bears against one side of the wall of the box is preferably offset slightly at $3^a$, as shown in Fig. 3, so that the body portion 2 of the plug will lie flush, or substantially flush, with the wall of the box when the plug is arranged in operative position, as shown in Fig. 2. In the preferred form of my invention, as herein shown, the means 3 on the body portion of the plug that bears against one side of the wall in which the plug is positioned consists of a pair of ears that are integrally connected to the body portion 2 of the plug and project radially from said body portion, and the means 4 on said body portion which is adapted to be bent into engagement with the other side of the wall in which the plug is positioned, consists of a pair of integral ears on said body portion that project laterally from one side of same and which are arranged diametrically opposite each other intermediate the ears 3. It is immaterial, however, so far as my invention is concerned, how many ears the body portion of the plug is provided with, and the particular arrangement of said ears is also immaterial, so long as they are positioned in such a manner that they will coöperate with the wall of the box to securely lock the body portion of the plug in operative position in the hole in said wall in which said body portion is inserted. The ears 4 on the plug lie within the marginal edge of the body portion 2, so that they will pass through the hole 1 in the wall of the box when the plug is being inserted in the hole, as indicated by the broken lines in Fig. 2. The plug can be positioned in the box easily by simply slipping it into the hole far enough to cause the ears 3 on the body portion of the plug to bear against one side of the wall in which the hole is formed, and thereafter, bending the ears 4 into engagement with the other face or side of said wall, as shown in full lines in Fig. 2. The body portion of the plug completely fills the hole in which it is arranged, and as said body portion comprises means that bears against both sides of the wall in which the hole is formed, it will be impossible for the plug to work loose or drop out of place. The body portion of the plug herein shown is substantially disk-shaped, but it will of course be obvious that the body portion of the plug can be made of any other desired shape without departing from the spirit of my invention.

A hole plug of the construction above described can be manufactured cheaply on account of the fact that it can be stamped out of sheet metal; it can be installed or removed easily by simply bending the means 4 on the body portion of the plug into or out of engagement with one side of the wall of the box, and when the plug is arranged in operative position, it forms a permanent closure that cannot possibly work loose.

Having thus described my invention, what I claim, and desire to secure by Letters Patent, is:

A hole plug for structures of the character described, formed from sheet metal and comprising a body portion of substantially the same thickness as the wall in which it is adapted to be arranged and of such size that it will fit freely in a hole in said wall of the same outline and approximate size as said body portion, integral offset ears on said body portion that lap over one face of said wall and prevent said body portion from moving in one direction, and angularly-disposed ears on said body portion that pass through the hole in the wall during the operation of arranging the plug in position and which are adapted to be bent so as to engage the opposite face of said wall and thus retain the body portion in position.

In testimony whereof I hereunto affix my signature in the presence of two witnesses, this nineteenth day of April, 1916.

CHARLES WUENSCH.

Witnesses:
WELLS L. CHURCH,
GEORGE BAKEWELL.